Dec. 22, 1964 C. A. BEATY 3,162,823

MINIATURE TRIODE OSCILLATOR FOR HIGH FREQUENCY OPERATION

Filed Aug. 29, 1961 3 Sheets-Sheet 1

Dec. 22, 1964 C. A. BEATY 3,162,823

MINIATURE TRIODE OSCILLATOR FOR HIGH FREQUENCY OPERATION

Filed Aug. 29, 1961 3 Sheets-Sheet 2

Dec. 22, 1964 C. A. BEATY 3,162,823

MINIATURE TRIODE OSCILLATOR FOR HIGH FREQUENCY OPERATION

Filed Aug. 29, 1961 3 Sheets-Sheet 3

United States Patent Office 3,162,823
Patented Dec. 22, 1964

3,162,823
MINIATURE TRIODE OSCILLATOR FOR HIGH FREQUENCY OPERATION

Charles A. Beaty, Tampa, Fla., assignor to Trak Microwave Corporation, Tampa, Fla.
Filed Aug. 29, 1961, Ser. No. 134,724
7 Claims. (Cl. 331—97)

This invention relates to the generation of high frequency electrical signals and in particular to ultra high frequency and microwave oscillators.

The invention is described as embodied in a tuned-plate, tuned-cathode, and grounded-grid oscillator in which strip line techniques are made use of to form equivalent tuned coaxial lines.

It is among the objects of this invention to provide an oscillator of miniature size.

Another object of the invention is to provide an oscillator having two separate distributed tuned circuits in juxtaposition.

Still another object of the invention resides in the construction of resonant coaxial lines positioned side-by-side within an integral metal housing.

It is still another object of the invention to provide measn for making D.-C. connections to the vacuum tube elements through the interior of a coaxial line center conductor.

Another object of the invention is to provide a coaxial line center conductor in the form of a cantilever beam having on the free end thereof means for making contact with an active tube element, and means acting through the cantilever beam for maintaining continuous pressure between the free end of the beam and the terminal of the tube.

Another object of the invention is to provide improved means for preventing the leakage of R.-F. energy from the oscillator.

Still another object is to provide improved means for manually varying the frequency of operation.

Still another object is to provide a compact oscillator which can be readily assembled and disassembled.

These and other objects will be in part pointed out in and in part apparent from the following description considered in conjunction with the accompanying drawings, in which.

In the description and claims related to the invention, the term coaxial line is not limited to one in which the inner and outer conductors are circular in cross-section nor is the term limited to one in which the two conductors have the same cross-sectional shape. The term is intended rather to refer to lines which operate electrically in the manner of coaxial lines with concentric elements and in which a central conductor is positioned within a conductive surface completely surrounding and spaced from the central conductor.

Figure 1:
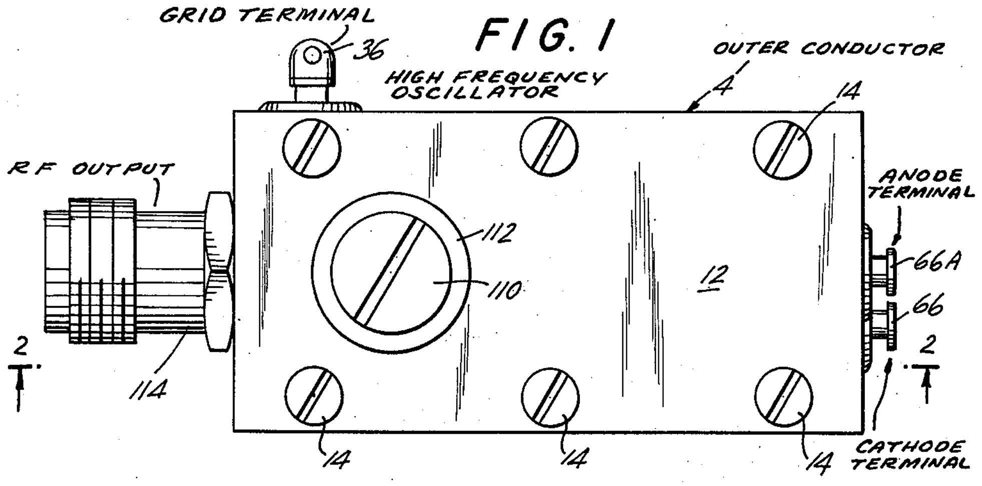
FIGURE 1 is a plan view of an oscillator embodying the invention.

The oscillator shown in FIGURE 1 is housed in a shell forming an outer conductor and generally indicated at 4 formed of silverplated brass, aluminum or other suitable material. The outer conductor shell 4 may be formed, for example, from a square metal bar by hobbing out portions of the metal on the upper and lower sides to form two cavities, generally indicated at 6 and 8 in FIGURE 2, separated by a transverse partition 10. One side of the cavity 6 is closed by means of a cover plate 12 secured by screws 14. One side of the other cavity 8 is closed in similar manner by a cover plate 16.

Figure 7:
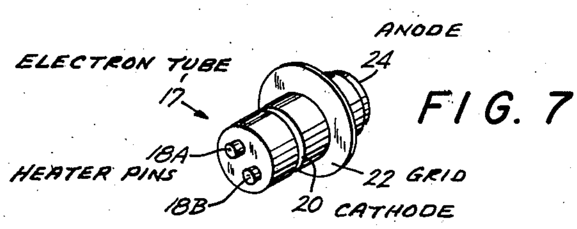
FIGURE 7 is a perspective view of a vcuum tube suitable for use in the oscillator.

In this particular example the oscillator makes use of a ceramic type triode vacuum tube having planar grid, cathode, and anode elements. Such a tube is sold by Trak Microwave Corporation, Tampa, Florida, under number TK–9127 and by General Electric Company under the designation 7486. This tube, generally indicated at 17 in FIGURE 7, is provided with two heater pins 18A and 18B extending from the end of the ceramic body. Contact to the cathode is made through a cathode-contact ring 20 recessed below the surface of the tube. Contact to the gride is made through a grid-contact ring 22 formed integrally with the tube and extending outwardly from the ceramic body. Connection to the anode is made through an anode cap 24 positioned on the opposite end of the tube from the heater contact pins 18A and 18B.

Figure 8:
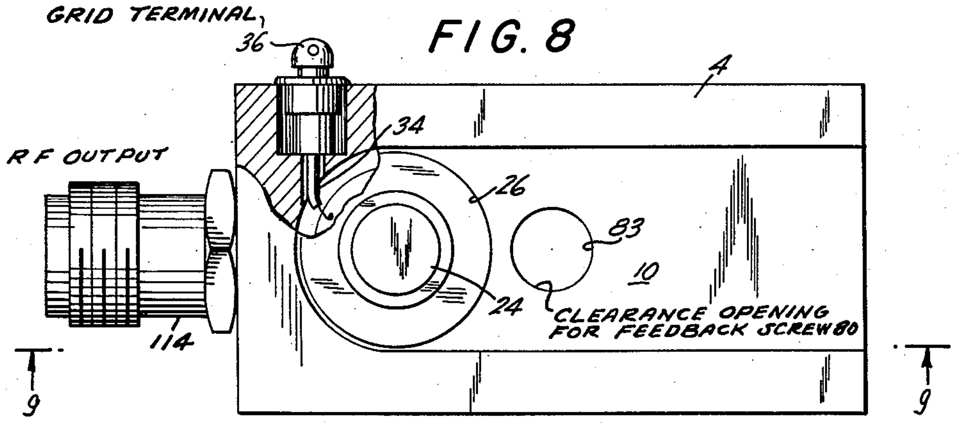
FIGURE 8 is a top plan view similar to FIGURE 1 but with the cover and anode conductor structure removed, showing the mounting of the tube in the oscillator housing, and with a portion of the outer shell being cut away to show the connecting means for the grid circuit.

The tube 17 extends through a threaded opening 26 (FIGURE 8) in the partition 10 with the anode cap 24 projecting into the anode coaxial line cavity 6 and the cathode 20 and heater pins 18A and 18B extending into the cathode coaxial line cavity 8.

The grid contact ring 22 is positioned in the opening 26 in the partition 10 where it is anchored by two annular nuts 28 and 29. The grid-contact ring 22 is positioned against and makes contact with a metal washer 30 positioned within the hole 26 and is insulated from the nut 29 by a dielectric washer 32. The grid washer 30 is separated from the nut 28 by a dielectric washer 33. The grid washer 30 is connected by means of an insulated lead 34 (FIGURES 8 and 8A) extending through the partition 10 and through the outer wall of the housing 4 to an external terminal 36. Thus, the grid of the tube 17 is maintained at the same R.-F. potential as the shell 4 by the capacity through the dielectric washers 32 and 33 but is insulated from the shell so far as direct current is concerned. In this example there is a capacity of about 50 $\mu\mu$f. between the grid ring 22 and the shell 4. In operation, the terminal 36 may be connected to the shell 4 through a fixed resistor mounted on the outside of the structure.

Figure 9:
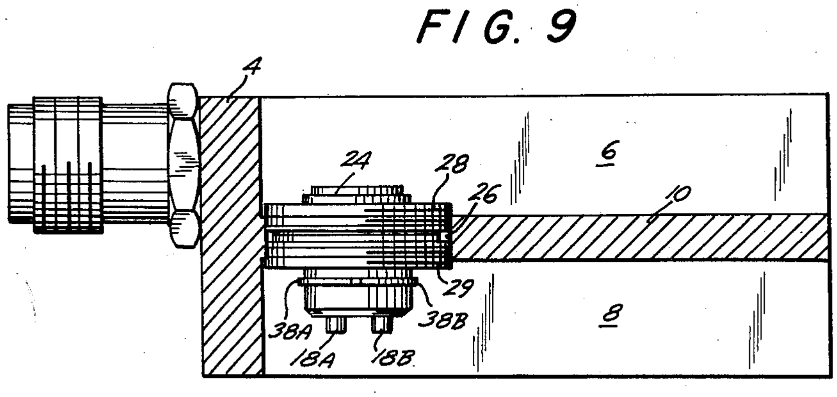
FIGURE 9 is a vertical sectional view of the oscillator shell taken along line 9—9 of FIGURE 8.
Figures 9A, 10:
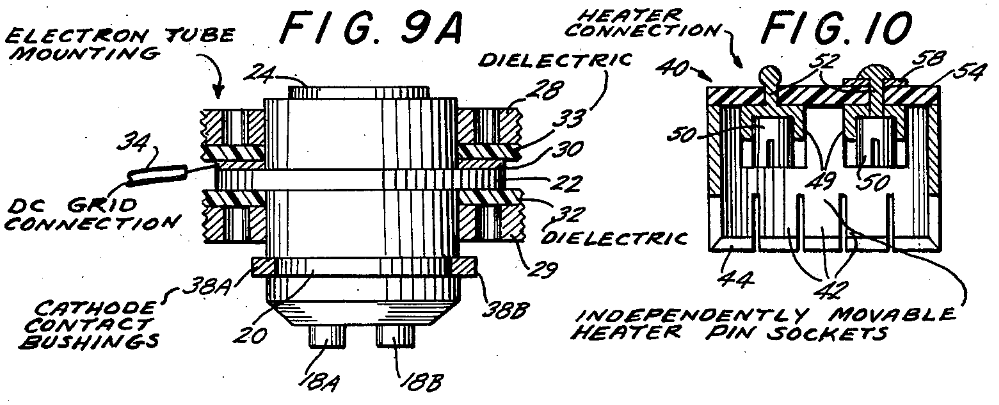
FIGURE 9A is a sectional detailed view also taken on line 9—9 of FIGURE 8.
FIGURE 10 is a partial sectional view taken along line 10—10 of FIGURE 5 showing the construction of the cathode socket.

In order to make contact with the cathode-contact ring 20, two semi-annular cathode-contact bushings 38A and 38B (FIGURE 9A) are positioned around the contact ring 20 with their inner surfaces dimensioned to make intimate contact throughout the circumference of the cathode-contact ring 20. The outer surface of a cathode socket 40

(FIGURE 10) is formed of beryllium copper or other suitable material and has annularly arranged spring fingers 42 to insure low inductance contact completely around the cathode-contact bushings 38A and 38B. The free end of each of the fingers 42 is tapered as shown at 44 so that the socket will slide over the cathode-contact bushings 38A and 38B.

Figure 2:
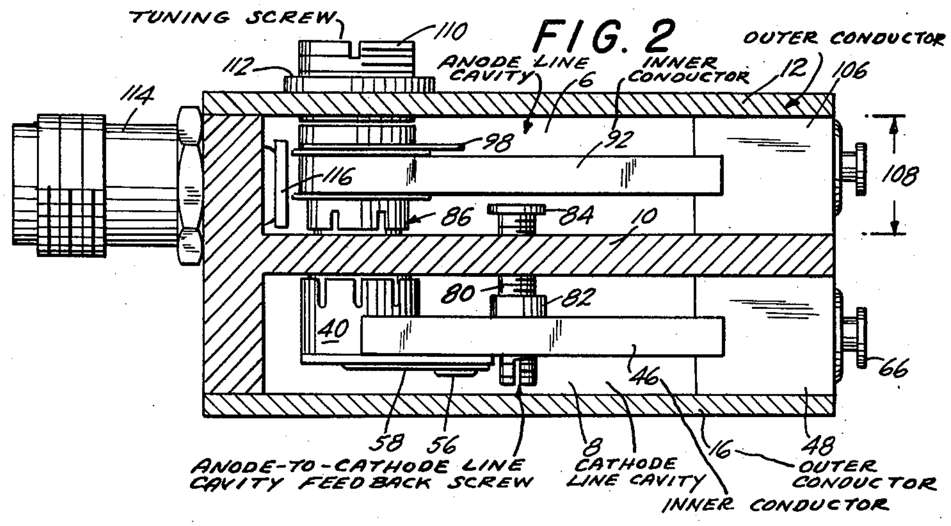
FIGURE 2 is a longitudinal section taken along line 2—2 of FIGURE 1 showing the two juxtaposed coaxial line cavities.
Figure 6:
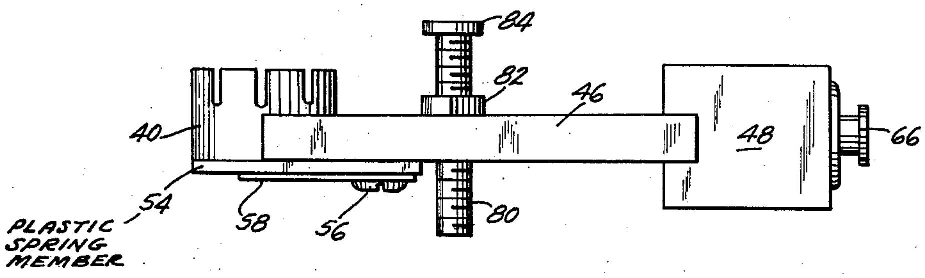
FIGURE 6 is a view in side elevation of the inner conductor shown in FIGURE 5.

The annular cathode socket 40 is secured by soldering or other means to a cathode line inner conductor 46 (FIGURE 6) which extends longitudinally within the cathode cavity 8 (FIGURE 2) and which is secured to and supported by a terminal block 48 which fits within the end portion of the shell 4 (FIGURE 2).

Figure 5:
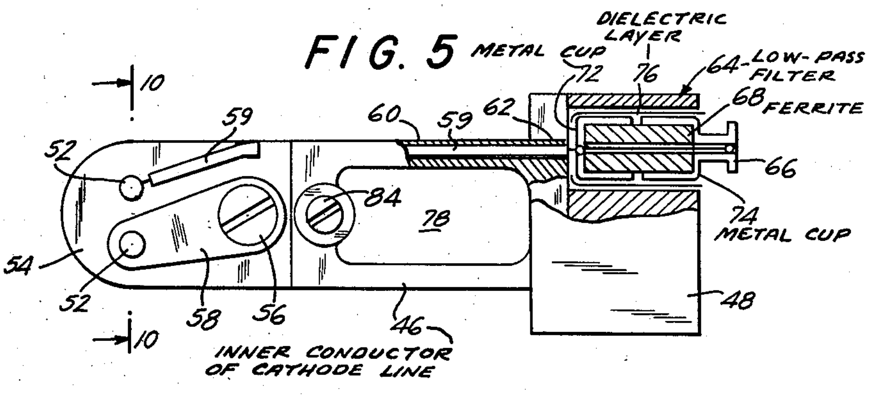
FIGURE 5 is a bottom plan view of the inner conductor of the cathode line with a portion of the structure sectioned to show the arrangement of the cathode filter.

Contact is made to the heater contact pins 18A and 18B by means of two heater pin sockets 49 which are provided with a cup-shaped portion 50 (FIGURE 10) formed of peripherally arranged spring fingers and a base portion 52 which extends through a clearance opening in a plastic sheet 54 covering the base end of the cathode socket 40. The plastic sheet member 54 is secured by a single screw 56 to the cathode line inner conductor 46. The base portion 52 of each socket 49 fits loosely in the plastic sheet 54 so that each of the sockets 49 can move independently, laterally and angularly enough to accommodate variations in the positions and angles of the heater pins 18A and 18B. Since the plastic sheet 54 is secured only by the screw 56, it serves as a spring member free to flex sufficiently to accommodate differences in longitudinal dimensions of the tube 17, that is, variations in the distance between the grid-contact ring 22 and the ends of the heater pins 18A and 18B. One of the heater pin sockets 49 is connected by a metal strap 58 (FIGURE 5) to the screw 56 and through the cathode line inner conductor line 46 and metal terminal block 48 to the shell 4.

In order to provide a connection for the other heater socket 49, its base portion 52 is connected to an insulated lead 59 which passes through a groove 60 in one side of the cathode line inner conductor 46 and through an opening 62 in the supporting block 48. In order to prevent leakage of R-F energy, a low-pass filter, generally indicated at 64, is built within the terminal block 48. The lead 59 passes directly through the block and is secured to a solder terminal 66 on the outer end of the block 48. This portion of the wire within the block 48 is surrounded by a cylindrical length of ferrite 68, which may, for example, to be a conventional ferrite formed of zinc, manganese and iron oxides. At the point where the wire 59 enters the ferrite 68, it is soldered to a metal cup 72 which surrounds one end of the ferrite and extends along its periphery for a distance slightly less than one-half the length of the ferrite 68. A similar metal cup 74 is formed integrally with the solder terminal 66 and fits over the opposite end of the ferrite but does not make electrical contact with the cup 72. The two cups 72 and 74 are insulated from the metal block 48 by a layer 76 of dielectric material such as Mylar film. With this arrangement the cups 72 and 74 serve respectively as input and output capacitors separated by the inductance added to the circuit by the ferrite cylinder 68. The wire 59 within the groove 60 and the filter assembly may be secured permanently in place by epoxy or other suitable cement.

If the lead 59 were to extend through the space in the cathode line cavity 8, it would pick up excessive R-F energy and would disturb the electrical fields. By burying the lead 59 below the surface of the line 46 in the groove 60, this difficulty is avoided.

In operation it is desirable that the cathode circuit be tuned to a slightly lower frequency than the anode circuit. This can be accomplished by lengthening the cathode inner conductor 46. However, the same effect can be achieved with a correspondingly shorter over-all oscillator length by forming a central opening as indicated at 78 in FIGURE 5. The resulting division of the line 46 into two separated parallel branches for a portion of its length increases the characteristic impedance and lowers the resonant frequency of the line.

To provide sustained oscillation, it is necessary to feed back R-F energy from the anode line cavity 6 to the cathode line cavity 8. This is accomplished by means of an adjusting screw 80 (FIGURES 2 and 6) which is in threaded engagement with a split bushnig 82 mounted in the cathode line inner conductor 46 and has a capacity probe 84 secured to one end. The screw 80 extends through a clearance opening 83 (FIGURE 8) in the partition 10 into the anode line cavity 6.

Figure 4:
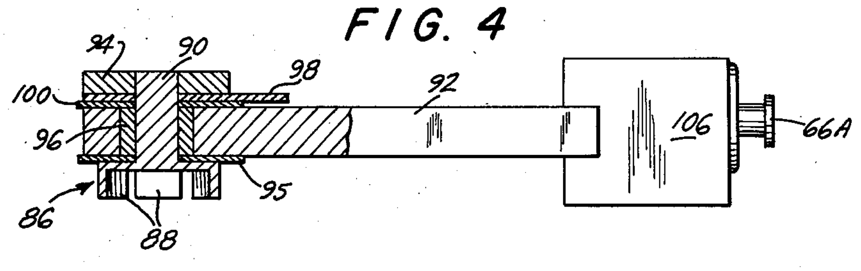
FIGURE 4 is a view in side elevation of the anode line shown in FIGURE 3 with a portion of the structure sectioned to show the construction of the anode socket.

Connection is made to the anode cap 24 by means of an anode socket 86 (FIGURE 4) formed of beryllium copper, Phosphor bronze, or other suitable spring contact material and having spring fingers 88 adapted to make circumferential contact with the anode cap 24. A threaded shank 90 is secured to the head portion of the socket 86 and extends through the anode line inner conductor 92 into threaded engagement with a nut 94. The head portion of the socket 86 is insulated from the conductor 92 by a dielectric washer 95, and the shank 90 is insulated from the line 92 by an insulated bushnig 96. A solder terminal 98 is positioned beneath the nut 94 and insulated from the line 92 by a dielectric washer 100. The dielectric washers 95 and 100 and the bushing 96 provide sufficient capacity coupling between the anode cap and the conductor 92 to provide a low-impedance path for R-F current.

Figure 3:
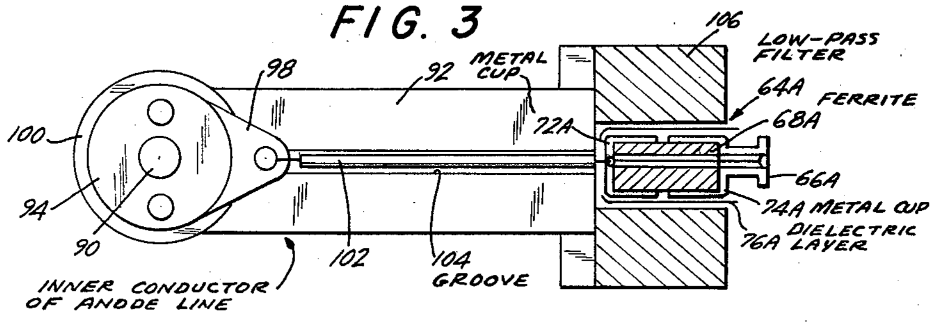
FIGURE 3 is a plan view of the inner conductor of the anode line with the right-hand portion of the structure shown in horizontal axial section to expose the filter assembly.

In order to provide B+ voltage for the anode, an insulated wire lead 102 (FIGURE 3) is connected to the terminal 98 and extends within a groove 104 in the surface of the anode line inner conductor 92 and this groove extends to a metal terminal block 106 which is connected to the end of and supports the anode line 92.

The lead 102 passes through a low-pass filter assembly, generally indicated at 64A, to an external solder terminal 66A. This filter 66A may be identical with the filter 64 described in connection with the cathode line inner conductor 46 and corresponding parts have been correspondingly numbered followed by the suffix A.

In order to maintain firm contact between the anode socket 86 and the anode cap 24, the terminal block 106 is formed so that its dimension indicated at 108 in FIGURE 2 is preferably slightly greater, for example, by one thousandth of an inch or less, than the height of the adjacent sidewalls of the shell 4 so that when the plate 12 is tightened into position by means of the screws 14, the cantilever-supported socket 86 is maintained under continuous pressure against the anode cap 24.

Thus, the oscillator includes two juxtaposed one-quarter wave length parallel coaxial lines resulting in significant saving of length over arrangements in which the coaxial lines are arranged in end-to-end or only partially overlapping relationship.

The anode line is the primary frequency determining element, and its operating frequency is adjusted by means of a screw 110 (FIGURE 2) which is in threaded engagement with the plate 12 and extends into the anode line cavity directly opposite the anode cap 24 of the tube. After adjustment to the desired frequency, the screw 110 is locked in position by means of a nut 112. By means of this arrangement a tuning range of 5 to 10 percent can be obtained.

To extract power from the oscillator, a coaxial connector 114 is positioned in the end wall of the shell 4 with its inner conductor connected to a capacity probe 116 extending into the anode line cavity adjacent the anode socket 86.

It will thus be seen that there has been provided a rugged and economical oscillator well adapted to meet the ends and objects hereinbefore set forth and which provides significant advantages in size and operational characteristics over those heretofore obtainable and which is suited for use under a variety of conditions and in particular for rigorous commercial and military applications.

What is claimed is:

1. A high frequency oscillator comprising a tube having a cathode, a grid, and an anode, a first coaxial line having an inner and an outer conductor, means coupling the inner conductor of said first coaxial line to said cathode, the inner conductor of said first coaxial line having a portion of reduced cross section formed by two spaced parallel arms, a second coaxial line having an inner and an outer conductor, means coupling said inner conductor of said second coaxial line to said anode, said first and second coaxial lines being substantially parallel and positioned in side-by-side relationship, and having a length of approximately one quarter wave length, and housing means surrounding both of said coaxial lines and forming said outer conductors of both coaxial lines.

2. A high frequency oscillator comprising a tube having a cathode, a grid, and an anode, a first coaxial line having an inner and an outer conductor, means coupling the inner conductor of said first coaxial line to said cathode, a second coaxial line having an inner and an outer conductor, means coupling said inner conductor of said second coaxial line to said anode, said first and second coaxial lines being substantially parallel and positioned in side-by-side relationship, and first and second D.-C. connecting means respectively extending along and recessed within and being insulated from said inner conductors of said first and second coaxial lines.

3. A high frequency oscillator comprising an electron tube having a cathode, a grid, and an anode, a shell housing of conductive material having first and second internal cavities, means for supporting said tube within said shell housing with portions of said tube extending into each of said cavities, a first quarter-wave anode inner conductor coupled to said anode and extending within said first cavity, a second quarter-wave cathode inner conductor coupled to said cathode and extending within said second cavity, means for making D.-C. connection to said anode including a D.-C. conductor extending longitudinally along, recessed within, and insulated from said anode inner conductor, said D.-C. conductor extending outwardly through said housing, and a low-pass filter for said D.-C. connection including a member of ferrite material surrounding asid D.-C. conductor and positioned within said shell housing.

4. A high frequency oscillator comprising a tube having a cathode, a grid, an anode, and first and second heater contact pins, a shell of conductive material having first and second internal cavities, means supporting said tube within said shell with portions of said tube extending into each of said cavities, capacitive means forming a low-impedance R-F path between said grid and said shell, an anode inner conductor coupled to said anode and extending within said first cavity, a cathode inner conductor coupled to said cathode and extending within said second cavity, first and second heater pin sockets adapted to engage and make contact with said heater contact pins, and spring means secured to said cathode inner conductor and resiliently supporting said sockets for engagement with said heater pins.

5. A high frequency oscillator comprising a tube having a cathode, a grid, and an anode, a shell of conductive material having first and second internal cavities, said cavities extending in parallel side-by-side relationship, means supporting said tube within said shell with portions of said tube extending into each of said cavities, capacitive means forming a low-impedance R-F path between said grid and said shell, a first quarter-wave anode inner conductor coupled to said anode and extending within said first cavity, a second quarter-wave cathode inner conductor having a portion of reduced cross section and coupled to said cathode and extending within said second cavity, first D.-C. connecting means extending from said anode along and beneath the surface of said first inner conductor and extending outwardly through said shell, second D.-C. connection means extending from said cathode along and beneath the surface of said second inner conductor and extending outwardly through said shell, and first and second low-pass filter means connected respectively with said first and second connecting means and positioned within the conductive material of said shell.

6. In an oscillator having an outer conductive shell, and a vacuum tube having anode and cathode electrodes, a tuned circuit coupled to each said electrode and positioned within said shell, means for making D.-C. connection to each said electrode including a low-pass filter and a conductor connected to each said electrode, said filter having a sheath of ferrite metal surrounding said conductor, and a metal cup partially surrounding said ferrite sheath and connected to said conductor, said metal cup being positioned in said shell and a thin layer of insulation material for insulating said cup from said shell providing capacitance between said cup and shell.

7. A high frequency oscillator comprising an elongated generally rectangular metal shell having a transverse metal partition therein forming first and second internal juxtaposed cavities on opposite sides of said partition, a vacuum tube having first and second heater contact pins, a cathode-contact ring, a grid-contact ring, and an anode cap, said tube extending through said partition and having said anode cap positioned in said first cavity and said cathode-contact ring and heater contact pins positioned in said second cavity, capacitance means coupling said grid-contact ring to said partition, an anode line inner conductor extending longitudinally within said first cavity, socket means at one end of said anode line arranged to engage said anode cap, means at the opposite end of said anode line forming part of said housing and arranged to support said anode line inner conductor, a cathode line inner conductor extending longitudinally within said second cavity, means at one end of said cathode line coupling it to said cathode-contact ring, means at the opposite end of said cathode line forming part of said housing and supporting said cathode line inner conductor, heater pin socket means for engaging said heater pins, resilient support means for said heater pin socket means mounted on said cathode line inner conductor, and conductive means extending lengthwise within the surface of said cathode line inner conductor for making connection to said heater pin socket means.

References Cited by the Examiner

UNITED STATES PATENTS

| | | | |
|---|---|---|---|
| 2,451,502 | 10/48 | Lisman et al. | 331—98 |
| 2,531,693 | 11/50 | Lansman | 331—98 |
| 2,762,918 | 9/56 | Wise | 331—98 |
| 2,763,783 | 9/56 | Lorenzen | 331—98 |

ROY LAKE, *Primary Examiner.*

JOHN KOMINSKI, *Examiner.*